United States Patent
Lemarchand

(10) Patent No.: US 10,557,965 B2
(45) Date of Patent: Feb. 11, 2020

(54) DEVICE, SYSTEM, AND METHOD FOR DETECTING HUMAN PRESENCE

(71) Applicant: STMicroelectronics (Grenoble 2) SAS, Grenoble (FR)

(72) Inventor: Olivier Lemarchand, Grenoble (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 420 days.

(21) Appl. No.: 15/367,780

(22) Filed: Dec. 2, 2016

(65) Prior Publication Data

US 2018/0157376 A1    Jun. 7, 2018

(51) Int. Cl.
| | | |
|---|---|---|
| G01V 8/12 | (2006.01) | |
| G06F 1/3231 | (2019.01) | |
| G01S 17/10 | (2006.01) | |
| G01S 17/02 | (2006.01) | |

(52) U.S. Cl.
CPC ............ G01V 8/12 (2013.01); G06F 1/3231 (2013.01); *G01S 17/026* (2013.01); *G01S 17/10* (2013.01)

(58) Field of Classification Search
CPC ...... G06F 3/0425; G06F 3/017; G06F 1/3231; G01S 17/026; G01S 7/484; G01S 17/10; G01S 17/58; G01V 8/12
See application file for complete search history.

(56) References Cited

U.S. PATENT DOCUMENTS

| | | | |
|---|---|---|---|
| 5,701,117 A | 12/1997 | Platner et al. | |
| 6,226,076 B1* | 5/2001 | Yoshida | G01C 15/002 356/5.01 |
| 6,288,775 B1* | 9/2001 | Tanaka | G01S 7/4812 342/135 |
| 6,560,711 B1 | 5/2003 | Given et al. | |
| 6,650,322 B2 | 11/2003 | Dai et al. | |
| 6,802,016 B2 | 10/2004 | Liu | |
| 7,669,228 B2 | 2/2010 | Moon et al. | |
| 2006/0072100 A1* | 4/2006 | Yabe | G01C 3/08 356/4.04 |
| 2006/0290921 A1* | 12/2006 | Hotelling | G01S 17/026 356/152.2 |
| 2007/0100666 A1* | 5/2007 | Stivoric | F24F 11/30 705/3 |
| 2007/0182949 A1* | 8/2007 | Niclass | G01C 3/08 356/3 |

(Continued)

OTHER PUBLICATIONS

STlife.augmented, AN4846 Application Note, "Using multiple VL53L0X in a single design," DocID029133 Rev. 1, pp. 1-7, May 2016.

(Continued)

*Primary Examiner* — Nitin Patel
*Assistant Examiner* — Amy Onyekaba
(74) *Attorney, Agent, or Firm* — Slater Matsil, LLP

(57) ABSTRACT

An embodiment device includes an optical source configured to transmit an optical pulse and an optical sensor configured to receive a reflection of the optical pulse. The device further includes a processor configured to determine a parameter based on the reflection, the parameter indicative of a distance between the device and a target; and a controller configured to generate a first control signal based on the parameter, the first control signal being configured to control an operation of the optical source.

27 Claims, 4 Drawing Sheets

(56) References Cited

U.S. PATENT DOCUMENTS

| | | | |
|---|---|---|---|
| 2008/0036996 A1* | 2/2008 | O'Connor | G01C 3/08 356/5.01 |
| 2011/0163872 A1* | 7/2011 | Pasveer | G01S 15/025 340/539.12 |
| 2011/0270563 A1* | 11/2011 | Kanokogi | G01C 15/002 702/97 |
| 2012/0042183 A1 | 2/2012 | Peng | |
| 2012/0069322 A1* | 3/2012 | Kostamovaara | G01S 7/4865 356/5.01 |
| 2012/0092485 A1* | 4/2012 | Meinherz | F16P 3/142 348/91 |
| 2013/0214166 A1* | 8/2013 | Barlow | G01S 5/16 250/342 |
| 2014/0160461 A1* | 6/2014 | Van Der Tempel | G01S 17/10 356/5.01 |
| 2014/0247695 A1* | 9/2014 | Vangeel | H04L 43/0811 367/93 |
| 2014/0291491 A1* | 10/2014 | Shpunt | G01J 11/00 250/214.1 |
| 2015/0285625 A1* | 10/2015 | Deane | G01S 17/10 348/140 |
| 2015/0338510 A1* | 11/2015 | Pandharipande | H05B 33/0815 367/93 |
| 2016/0003493 A1* | 1/2016 | Katz | F24F 11/30 700/275 |
| 2016/0116592 A1* | 4/2016 | Hiromi | G06F 3/0304 345/156 |
| 2016/0291138 A1* | 10/2016 | Drader | G01S 7/4863 |
| 2017/0199272 A1* | 7/2017 | Takaoka | G01S 17/10 |
| 2018/0088236 A1* | 3/2018 | Eichenholz | G01S 17/00 |
| 2018/0295704 A1* | 10/2018 | Haverlag | H05B 37/0245 |
| 2018/0299553 A1* | 10/2018 | Takemoto | G01S 17/10 |

OTHER PUBLICATIONS

STlife.augmented, VL53L0X, "World Smallest Time-of-Flight ranging and gesture detection sensor," DocID29104 Rev. 1, pp. 1-40, May 2016.

* cited by examiner

DEVICE, SYSTEM, AND METHOD FOR DETECTING HUMAN PRESENCE

TECHNICAL FIELD

The present disclosure relates generally to detection of objects in an environment, and, in particular embodiments, to a device, a system, and a method for detecting human presence.

BACKGROUND

Presence detectors may be implemented using a variety of technologies. For example, pneumatic tubes or hoses may be placed across a roadway to detect the pressure of a vehicle as its tires roll over the tubes or hoses. Such detectors operate through physical contact with the object being detected. In another example, an optical light beam emitter and sensor system may detect the presence of an object when the object interrupts a projected light beam. In addition, in-ground inductance loops may detect a vehicle in close proximity by detecting a change in magnetic inductance. Other examples of presence detectors include video detectors and audio detectors.

Time-of-flight (ToF) presence detectors are used in various applications to detect the presence of objects within a specified field of detection. ToF presence detectors generally include one or more optical devices, such as optical emitters and optical sensors, for example. Unlike pneumatic tubes, optical devices in ToF presence detectors do not require physical contact with the item being detected. Unlike inductance loops, optical devices in ToF presence detectors can sense an object regardless of the magnetic properties of the object. Further, unlike a simple optical beam interruption system, ToF detectors can determine the distance between the detector and the object.

ToF presence detectors may be used to detect the presence of an animate object (e.g. a human). Detection of an animate object can be used to detect malicious intrusions in a premises or a protected area, or to ensure that no person is present in a dangerous area before executing a maneuver. Detection of an animate object is also useful in the field of human-machine interaction, where it is desirable to detect the presence of humans in the vicinity of a machine. As an example, ToF presence detectors may be used to detect whether a human is approaching a device (e.g. a computer), and such detection can cause the device to unlock or exit a low-power state in advance of the human making physical contact with the device or a peripheral component (e.g. a mouse or a keyboard) in communication with the device. As a further example, ToF presence detectors may be used to detect whether a human has exited a sensor detection area, and such detection can cause the device to turn off, enter a low-power state, or enter a locked mode (e.g. for security reasons).

Current ToF presence detectors may suffer from false positives, where the detector is unable to distinguish a dormant animate object (e.g. a stationary or immobile human) from an inanimate object (e.g. a chair). Consequently, there may be a need for improved ToF presence detectors that minimize or substantially eliminate such false positives.

SUMMARY

In an embodiment, a device includes an optical source configured to transmit an optical pulse and an optical sensor configured to receive a reflection of the optical pulse. The device further includes a processor configured to determine a parameter based on the reflection, the parameter indicative of a distance between the device and a target; and a controller configured to generate a first control signal based on the parameter, the first control signal being configured to control an operation of the optical source.

In an embodiment, a method includes transmitting, using an optical source, a plurality of optical pulses; receiving, using an optical sensor, a plurality of reflections, each reflection being a reflection of a corresponding optical pulse off a target. The method further includes determining, using a processor, a parameter based on the plurality of reflections, the parameter indicative of a distance between the optical source and the target; and controlling an operation of the optical source based on a comparison of the parameter against a plurality of thresholds.

In an embodiment, a system includes a presence detector and an electronic device coupled to the presence detector. The presence detector may include an optical source configured to transmit an optical pulse, and an optical sensor configured to receive a reflection of the optical pulse. The presence detector may further include a processor configured to determine a parameter based on the reflection, the parameter indicative of a distance between the presence detector and a target; and a controller configured to generate a first control signal based on the parameter, the first control signal being configured to control an operation of the optical source.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

An embodiment device and an embodiment method of detecting human presence minimize or substantially eliminate such false positives. The embodiment device and the embodiment method are configured to detect small movements (e.g. micro-variations in distance) that occur within a detection area of a presence detector. Detection of such micro-variations in distance may be sufficient to detect small movements (e.g. human breathing) of a dormant animate object, and thus the embodiment device and the embodiment method may be able to discriminate between a stationary inanimate object and a dormant animate object. In response to a determination that micro-variations in distance are present in the detection area of the presence detector, the embodiment device may cause an electronic device to remain in an active state so that the dormant animate object may continue using the electronic device without interruption. On the other hand, in response to a determination that micro-variations in distance are absent in the detection area of the presence detector, the embodiment device may cause the electronic device to switch from the active state to a low-power state, thereby conserving power of the electronic device. Furthermore, high accuracy ranging and micro-variation detection may consume a large amount of power, and thus, according to some embodiments, such ranging and detection is performed when both a parametric threshold and a temporal threshold are met in order to allow for efficient consumption of power by the presence detector.

Figure 1:
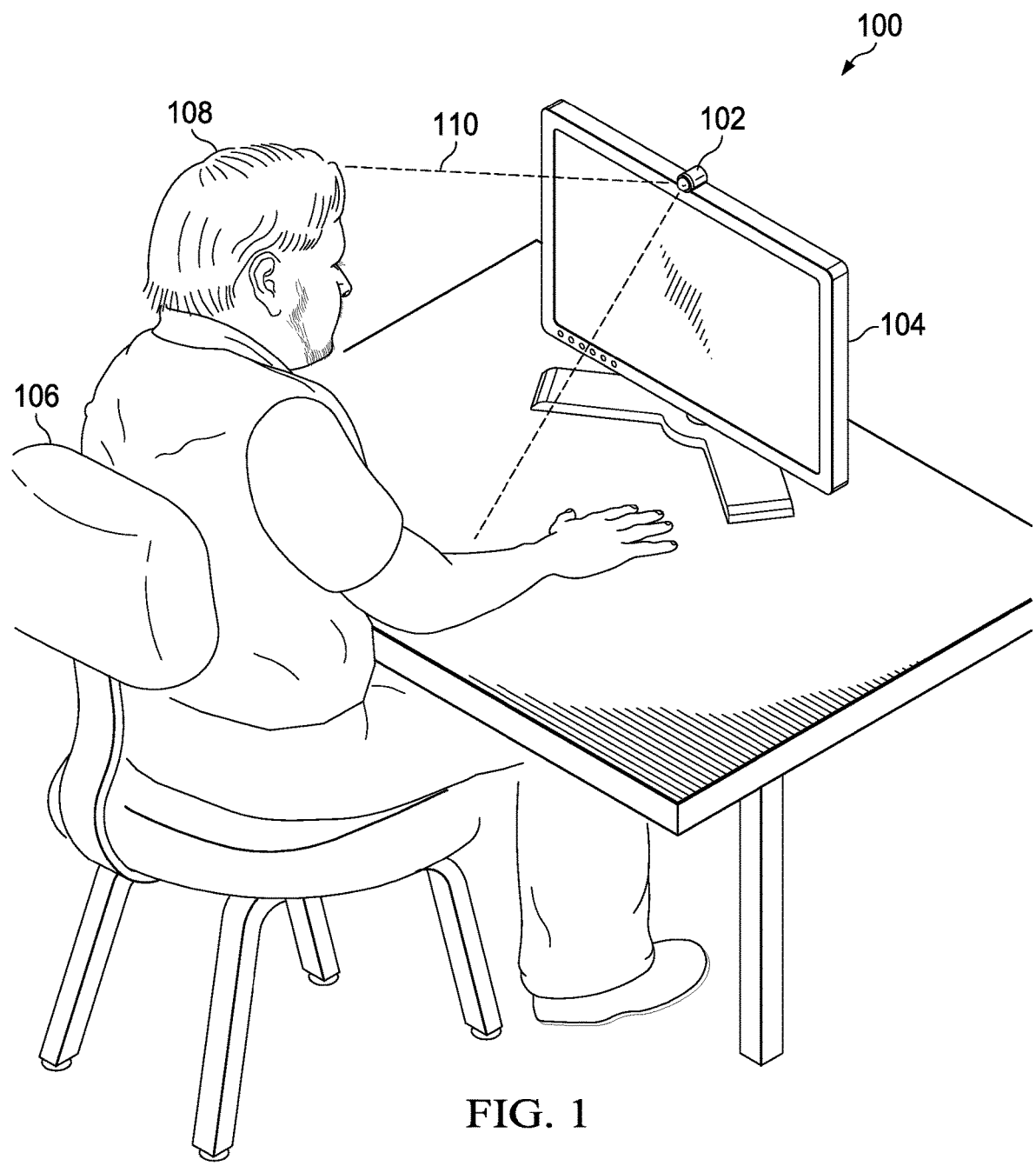
FIG. 1 shows a presence detection system 100, in accordance with an embodiment.

FIG. 1 shows a presence detection system 100, in accordance with an embodiment. The presence detection system 100 includes a presence detector 102, an electronic device 104, an inanimate object 106, and an animate object 108. In some embodiments, the presence detector 102 may be included in, mounted on, or integrated with the electronic device 104. In some embodiments, the presence detector 102 may be electrically and communicatively coupled to the electronic device 104. As an example, the presence detector 102 may be configured to generate a control signal that may cause the electronic device 104 to switch between a low-power state (e.g. a sleep mode) and an active state (e.g. a wake-up mode). In the example of FIG. 1, the electronic device 104 is depicted as a computer screen or monitor. However, other electronic devices 104 may be possible in other embodiments. As an example, the electronic device 104 may be a laptop or a mobile device having the presence detector 102 included therein or mounted thereon.

The presence detector 102 may be configured to detect objects within a detection area 110. The range, extent, and coverage area of the detection area 110 may depend, at least in part, on the circuitry of the presence detector 102. As an example, the detection area 110 may extend up to about 2 meters from the presence detector 102. The presence detector 102 may be a ToF presence detector that may be used in ToF ranging for various applications such as autofocus, proximity sensing, and object detection in robotics, drone technology, and internet-of-things (IoT) applications. ToF ranging is described in greater detail below in respect of FIG. 2.

The animate object 108 may be an object capable of motion without the assistance of an external force. For example, a person or an animal may be the animate object 108. In contrast, the inanimate object 106 may be object that is not capable of movement without the assistance of an external force. Examples of the inanimate object 106 may include a mug, box or chair. The animate object 108 that is not moving is herein distinguished from the inanimate object 106 by referring to the non-moving or immobile animate object 108 as a dormant animate object 108. The animate object 108 that is moving is herein distinguished from the inanimate object 106 and the dormant animate object 108 by referring to the moving animate object 108 as an active animate object 108.

The inanimate object 106 may be moved by the animate object 108. Since the inanimate object 106 may be moved by the animate object 108, in some embodiments, a moving inanimate object 106 may be characterized as an active animate object 108. For example, a chair or mug being moved by a person may initially be characterized as an active animate object. In such examples, the presence detector 102 may detect movement in the detection area 110 and thus determine or infer that an active animate object 108 may be present in the detection area no. Conversely, after the inanimate object 106 has ceased moving, the presence detector 102 may detect no movement in the detection area 110 and thus determine or infer that a stationary inanimate object 106 may be present in the detection area 110. From this description, it may be seen that the presence detector 102 may be able to discriminate between a stationary inanimate object 106 and an active animate object 108 by detecting gestures or macro-variations in movement that occur in the detection area 110.

However, there is still a need for the presence detector 102 to discriminate between a stationary inanimate object 106 and a dormant animate object 108. For example, by being able to discriminate between a stationary inanimate object 106 and a dormant animate object 108, the electronic device 104 may be able to remain in the active state even when a dormant animate object 108 is present in the detection area 110. A method for discriminating between a stationary inanimate object 106 and a dormant animate object 108 may be to configure the presence detector 102 to detect micro-variations in movement that occur in the detection area no. Such micro-variations in movement may be detected when a dormant animate object 108 is present in the detection area 110 (e.g. due to chest movement caused by respiration or small variations in posture and position). On the other hand, such micro-variations in movement may not be detected when a stationary inanimate object 106 (e.g. a chair or a mug) is present in the detection area 110. Embodiments of methods that allow the presence detector 102 to detect such micro-variations in movement are presented hereafter.

Figure 2:
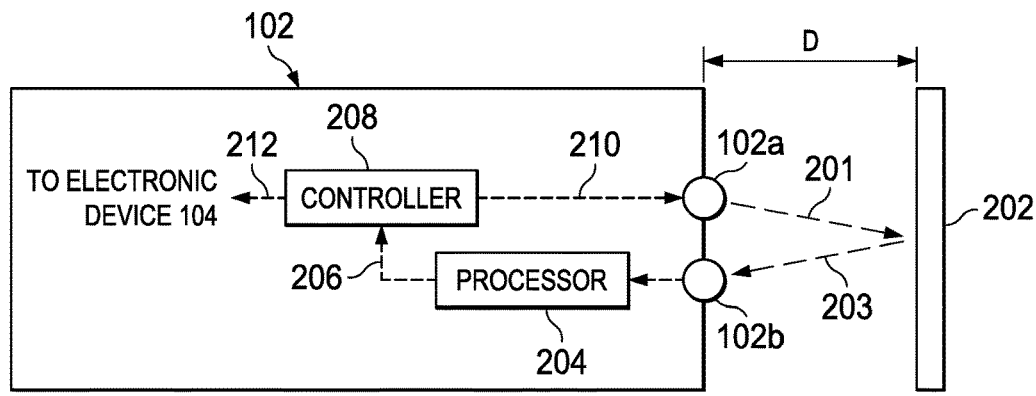
FIG. 2 shows a simplified block diagram of a presence detector and a target, in accordance with an embodiment.

FIG. 2 shows a simplified block diagram of the presence detector 102 and a target 202, in accordance with an embodiment. As described above, the presence detector 102 may be a ToF presence detector that may be used in ToF ranging for various applications such as autofocus, proximity sensing, and object detection in robotics, drone technology, and internet-of-things (IoT) applications. The presence detector 102 may include an optical source 102a and an optical sensor 102b. The optical source 102a may be configured to generate and emit (or transmit) a burst or pulse of optical energy. The transmission of the optical pulse by the optical source 102a is indicated in FIG. 2 as transmitted optical pulse 201. In some embodiments, the optical source 102a may include one or more laser diodes that emit light (e.g. infrared or visible light) in response to a control signal provided to the one or more laser diodes. In an embodiment where the optical source 102a includes a plurality of laser diodes, the plurality of laser diodes may be arranged in an array of laser diodes. In some embodiments, the optical energy generated by the optical source 102a may be a short duty cycle pulse train, as discussed below in respect of FIGS. 3 and 4. In some embodiments, the optical source 102a may include vertical-cavity surface-emitting lasers (VCSELs), quantum well lasers, quantum cascade lasers, interband cascade lasers, and vertical external-cavity surface-emitting lasers (VECSELs), although other types of optical sources may be possible in other embodiments.

When the burst or pulse of optical energy generated by the optical source 102 encounters the target 202 (e.g. the animate object 108 and/or the inanimate object 106), at least a portion of the energy of the pulse is reflected back to the presence detector 102. The reflection of the transmitted optical pulse 201 back to the presence detector 102 is indicated in FIG. 2 as optical reflection 203. The optical sensor 102b may be configured to convert the reflected optical signal 203 into an electrical pulse. The electrical pulse produced may be a digital pulse output or an analog pulse output, depending on the circuitry of the optical sensor 102b.

In an embodiment, the optical sensor 102b includes one or more optical elements, which may include one or more photo diodes (PDs), one or more avalanche photo diodes (APDs), one or more single-photon avalanche diodes (SPADs), or a combination thereof. In an example where the optical sensor 102b includes a plurality of such optical elements (e.g. PDs, APDs, SPADs), the optical elements may be arranged as a sensing array for receiving the optical reflection 203. Each of the optical elements of the optical sensor 102b may be configured to output an electrical pulse in response to receiving the optical reflection 203. In some embodiments, the optical sensor 102b may additionally include a filter for blocking light outside a predetermined range of frequencies (e.g. light outside the infra-red range) from reaching the sensing array.

The electrical pulse generated by each of the optical elements of the optical sensor 102b may be processed by a processor 204. In the embodiment shown in FIG. 2, the processor 204 is included in the presence detector 102. However, in other embodiments, the processor 204 may be included in the electronic device 104. The processor 204 may be configured to determine the time elapsed between transmission of the optical pulse 201 and reception of the optical reflection 203. The time elapsed may be encoded in a positive edge or a negative edge of the electrical pulse generated by each of the optical elements of the optical sensor 102b. The time elapsed may be called a time-of-flight measurement, and the distance between the presence detector 102 and the target (e.g. the stationary inanimate object 106 and/or the dormant animate object 108) may be calculated, by the processor 204, based upon the time-of-flight measurement. For example, a distance D (indicated in FIG. 2) between the presence detector 102 and the target 202 may be estimated from the product of the speed of light (which makes a 1 cm round-trip in 67 ps) and one-half of the time-of-flight measurement. An advantage of using optical energy to estimate the distance D is that a direct distance measurement, independent of size, color, or reflectance of the target 202, may be made. Additionally, such a distance measurement may be obtained expeditiously (e.g. in about 10 milliseconds).

Since each of the optical elements of the optical sensor 102b may generate an electrical pulse that is subsequently processed by the processor 204, the estimate of the distance D between the presence detector 102 and the target 202 may be a plurality of distance estimates D1, D2, ..., Dx, where x is the number of consecutive measurements used to estimate the distance D. The plurality of distance estimates D1, D2, ..., Dx may have a mean distance $D_{mean}$ and a standard deviation σ. In some embodiments, the processor 204 may determine the mean distance $D_{mean}$ and the standard deviation σ of the plurality of distance estimates D1, D2, ..., Dx. The processor 204 may further determine a parameter 206 from the plurality of distance estimates D1, D2, ..., Dx. As an example, the parameter 206 may be determined from the mean distance $D_{mean}$ and the standard deviation σ of the plurality of distance estimates D1, D2, ..., Dx. In some embodiments, a ratio of the standard deviation σ and the mean distance $D_{mean}$, expressed as a percentage, may be the parameter 206 determined by the processor 204.

The presence detector 102 may include a controller 208, which may receive the parameter 206 from the processor 204. Although the controller 208 and the processor 204 are depicted as separate blocks in the example of FIG. 2, the controller 208 and the processor 204 may be implemented by the same electronic component in other embodiments. The controller 208 may use the parameter 206 to detect macro-variations (e.g. variations in a range of about 5 centimeters to about 10 centimeters) and micro-variations (e.g. variations less than macro-variations, such as in a range of about 1 millimeter to about 2 millimeters) in the distance D between the target 202 and the presence detector 102, thereby allowing discrimination between a stationary inanimate object 106 (e.g. a chair or a mug) and a dormant animate object 108 (e.g. a substantially stationary human user of a computer who generates micro-variations in distance due to respiration). The method executed by the controller 208 to discriminate between macro-variations and micro-variations in the distance D is discussed in further detail below in respect of FIG. 5. In particular, as described below in respect of FIG. 5, macro-variations in the distance D may be detected when the presence detector 102 is in a standard ranging mode, while micro-variations in the distance D may be detected when the presence detector 102 is in a high accuracy ranging mode.

The controller 208 may be configured to vary the operation of the presence detector 102 (e.g. the optical source 102a). As an example, the controller 208 may be configured to control the operation of the optical source 102a by a first control signal 210. The first control signal 210 may vary the time duration during which a distance measurement is performed and the period of time between consecutive distance measurements. Stated in another way, the first control signal 210 may vary the length of time for which each optical pulse 201 is transmitted and the length of time between consecutive transmissions of the optical pulse 201. Varying these timings may cause the presence detector 102 to switch among a plurality of modes, and each mode of the presence detector 102 may be configured to detect either a macro-variation or a micro-variation in the distance D. The plurality of modes of the presence detector 102 and how each mode is configured to detect either a macro-variation or a micro-variation in the distance D is discussed in further detail below in respect of FIG. 4.

The controller 208 may further be configured to vary the operation of the electronic device 104 based on whether a macro-variation or a micro-variation in the distance D is detected. As an example, the controller 208 may be configured to control the operation of the electronic device 104 by a second control signal 212. The second control signal 212 may cause the electronic device 104 to switch between a low-power state (e.g. a sleep mode) and an active state (e.g. a wake-up mode). For example, in response to a determination that a macro-variation or a micro-variation in the distance D is detected, the second control signal 212 may prevent the electronic device 104 from switching from the active state to the low-power state. This example may illustrate the situation where it is desirable that the electronic device (e.g. a computer) does not enter a sleep mode when either a gesturing human or an immobile human is located in the detection area 110 of the presence detector 102. On the other hand, in response to a determination that a micro-variation in the distance D is not detected, the second control signal 212 may cause the electronic device 104 to switch from the active state to the low-power state, thereby reducing power consumption by the electronic device 104. This example may illustrate the situation where it is desirable that the electronic device 104 (e.g. a computer) enter a sleep mode when an empty chair is located in the detection area 110 of the presence detector 102. As an illustration of energy savings that are possible, continuous ranging by the presence detector 102 (e.g. at a ranging frequency of about 10 Hz) may consume about 0.02 Watts. However, a tablet device consumes about 8 Watts in the active state and about 0.4 Watts in the low-power state, while a laptop computer consumes about 80 Watts in the active state, about 20 Watts when its display is turned off, and about 1 Watt when it is in the low-power state.

Figure 3:
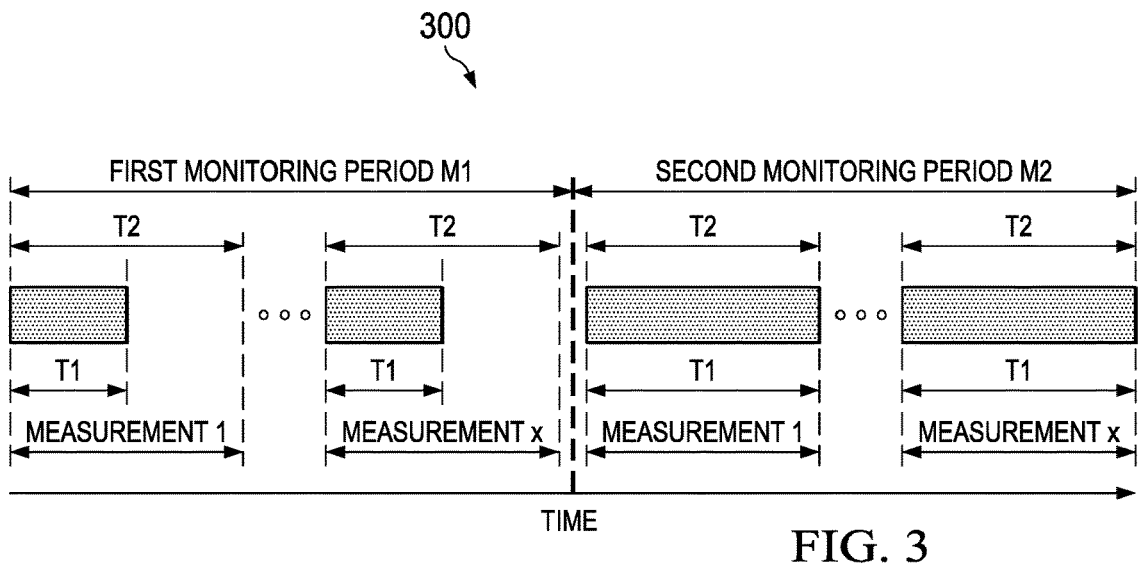
FIG. 3 shows a timing diagram that illustrates a plurality of distance measurements performed in each of a first monitoring period and a second monitoring period, in accordance with an embodiment.

FIG. 3 shows a timing diagram 300 that illustrates a plurality of distance measurements (labeled as Measurement 1 to Measurement x) performed in each of a first monitoring period M1 and a second monitoring period M2, in accordance with an embodiment. As shown in FIG. 3, each measurement in each monitoring period has a first time duration T1 during which a distance measurement is performed, and a second time duration T2 that denotes the period of time between consecutive distance measurements. Each of the above-described ToF measurements is performed during the first time duration T1, which may be referred to as a timing budget. The second time duration T2 may be referred to as a ranging period. As depicted in FIG. 3, during the first monitoring period M1, a first distance measurement may be performed during the first T1 seconds of the first T2 seconds block; a second distance measurement may be performed during the first T1 seconds of the second T2 seconds block; and so on. Similarly, during the second monitoring period M2, a first distance measurement may be performed during the first T1 seconds of the first T2 seconds block; a second distance measurement may be performed during the first T1 seconds of the second T2 seconds block; and so on. In some embodiments, a plurality of distance estimates D1, D2, . . . , Dx having a mean distance $D_{mean}$ and a standard deviation σ is generated for each monitoring period. As such, detection of variations in movement may be accomplished in each of the monitoring periods M1 and M2. In some embodiments, about 10 measurements may be performed in each of the first monitoring period M1 and the second monitoring period M2 (e.g. such that x is equal to about 10). Illustratively, the first monitoring period M1 may be used for macro-variation monitoring, while the second monitoring period M2 may be used for macro- and micro-variation monitoring. Stated differently, the presence detector 102 may be configured to determine, in the first monitoring period M1, whether macro-variations in movement occur within the detection area 110, and to determine, in the second monitoring period M2, whether macro- and micro-variations in movement occur within the detection area 110. As depicted in FIG. 3, the first time duration T1 may vary from one monitoring period to the next. In the example shown in FIG. 3, the first time duration T1 in the second monitoring period M2 is greater than the first time duration T1 in the first monitoring period M1. As an example, the first time duration T1 in the first monitoring period M1 may be about 33 milliseconds, while the first time duration T1 in the second monitoring period M2 may be about 1 second. As described below in respect of FIG. 4, this may be an effect of the first monitoring period M1 being used for macro-variation monitoring and the second monitoring period M2 being used for macro- and micro-variation monitoring.

Figure 4:
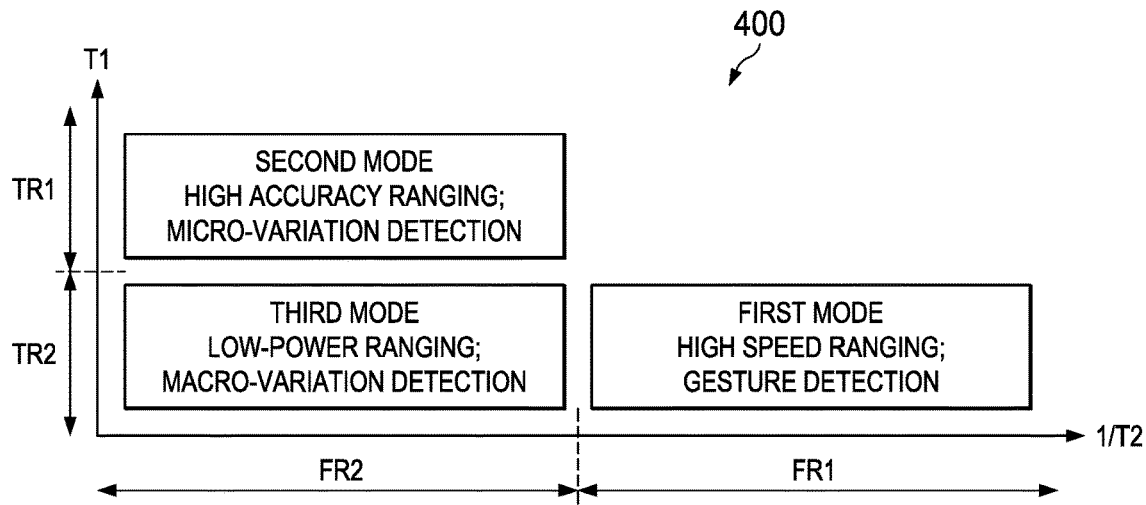
FIG. 4 shows various operating modes of the presence detector in FIG. 2 relative to the first time duration and the second time duration depicted in FIG. 3, in accordance with an embodiment.

FIG. 4 shows various operating modes of the presence detector 102 relative to the first time duration T1 and the second time duration T2, in accordance with an embodiment. The vertical axis denotes the first time duration T1 (e.g. the timing budget) measured in arbitrary units of time. The horizontal axis denotes the inverse of the second time duration T2 measured in arbitrary units of frequency (e.g. Hertz). In some embodiments, the inverse of the second time duration T2 may be referred to as a ranging frequency. As depicted in FIG. 4, the ranging frequency may be in a first frequency range FR1 or a second frequency range FR2. The first frequency range FR1 and the second frequency range FR2 may be non-overlapping frequency ranges. In some embodiments, the first frequency range FR1 may be between about 10 Hz and about 120 Hz (for fast gesture detection). As an example, the ranging frequency may be about 50 Hz (e.g. where the second time duration T2 is about 20 ms) when in the first frequency range FR1. On the other hand, the second frequency range FR2 may be between about 0.5 Hz and about 10 Hz. As an example, the ranging frequency may be about 1 Hz (e.g. where the second time duration T2 is about 1 s) when in the second frequency range FR2.

Referring now to the first time duration T1 depicted in FIG. 4, the first time duration T1 may be in a first time range TR1 or a second time range TR2. The first time range TR1 and the second time range TR2 may be non-overlapping time ranges. In some embodiments, the first time range TR1 may be between about 0.5 s and about 2 s. As an example, the first time duration T1 may be about 1 s when in the first time range TR1. On the other hand, the second time range TR2 may be between about 16 ms and about 100 ms. As an example, the first time duration T1 may be about 20 ms when in the second time range TR2.

When the first time duration T1 is in the second time range TR2 (e.g. equal to about 20 ms) and the ranging frequency is in the first frequency range FR1 (e.g. equal to about 50 Hz), the presence detector 102 may be in a first mode, as depicted in FIG. 4. When in the first mode, the presence detector 102 may be configured for high-speed ranging (e.g. since the time between consecutive distance measurements is short, such as about 20 ms). When in the first mode, the presence detector 102 may be able to detect gestures, such as gestures from an active animate object 108.

In some embodiments, when the first time duration T1 is increased, the accuracy of the estimated distance D increases. As an example, the standard deviation σ of the plurality of distance estimates D1, D2, . . . , Dx (e.g. obtained after a plurality of measurements or ranging periods T2) decreases as the first time duration T1 is increased. In some embodiments, increasing the first time duration T1 by a factor of N may decrease the standard deviation σ of the plurality of distance estimates D1, D2, . . . , Dx by a factor equal to the square-root of N. As such, when the first time duration T1 is in the first time range TR1 (e.g. equal to about 1 s), high accuracy ranging may be performed by the presence detector 102. Since the second time duration T2 is greater than or equal to the first time duration T1, the ranging frequency may be in the second frequency range FR2 (e.g. equal to about 1 Hz) when the first time duration T1 is in the first time range TR1. Consequently, as shown in FIG. 4, when the first time duration T1 is in the first time range TR1 (e.g. equal to about 1 s) and the ranging frequency is in the second frequency range FR2 (e.g. equal to about 1 Hz), the presence detector 102 may be in a second mode. When in the second mode, the presence detector 102 may be configured for high-accuracy ranging (e.g. since the first time duration T1 is increased). When in the second mode, the presence detector 102 may be able to determine whether micro-variations in movement occur within the detection area 110. Additionally, in some embodiments, the presence detector 102, in the second mode, may be able to determine whether macro-variations in movement occur within the detection area 110.

When the first time duration T1 is in the second time range TR2 (e.g. equal to about 20 ms) and the ranging frequency is in the second frequency range FR2 (e.g. equal to about 1 Hz), the presence detector 102 may be in a third mode, as depicted in FIG. 4. When in the third mode, the presence detector 102 may be configured for low-power ranging (e.g. since the optical energy generated by the optical source 102a is a short duty cycle pulse train). When in the third mode, the presence detector 102 may be able to determine whether macro-variations in movement occur within the detection area 110.

The power consumption associated with each of the modes of the presence detector 102 may be different. In some embodiments, the presence detector 102 may derive its power from the electronic device 104 or from the same source as the electronic device 104. The power consumed by the presence detector 102 when the presence detector 102 is in the first mode is greater than the power consumed when the presence detector 102 is in the second mode or the third mode. This may be due to the fact that the first time duration T1 is increased (e.g. to about 1 second) and the optical pulse 201 is continuously transmitted during this increased period of time. However, the power consumed by the presence detector 102 when the presence detector 102 is in the third mode may be less than the power consumed when the presence detector 102 is in the first mode or the second mode. This may be due to the fact that the first time duration T1 is decreased (e.g. to about 20 ms), while the time between distance measurements is increased (e.g. to about r second), thereby resulting in a short duty cycle pulse train. In light of the relative power requirements associated with the first mode, the second mode, and the third mode of the presence detector 102, it may be desirable to switch the presence detector 102 to the second mode (e.g. the high-power mode) infrequently or after a certain threshold is met. This is discussed in further detail below in respect of FIG. 5.

Figure 5:
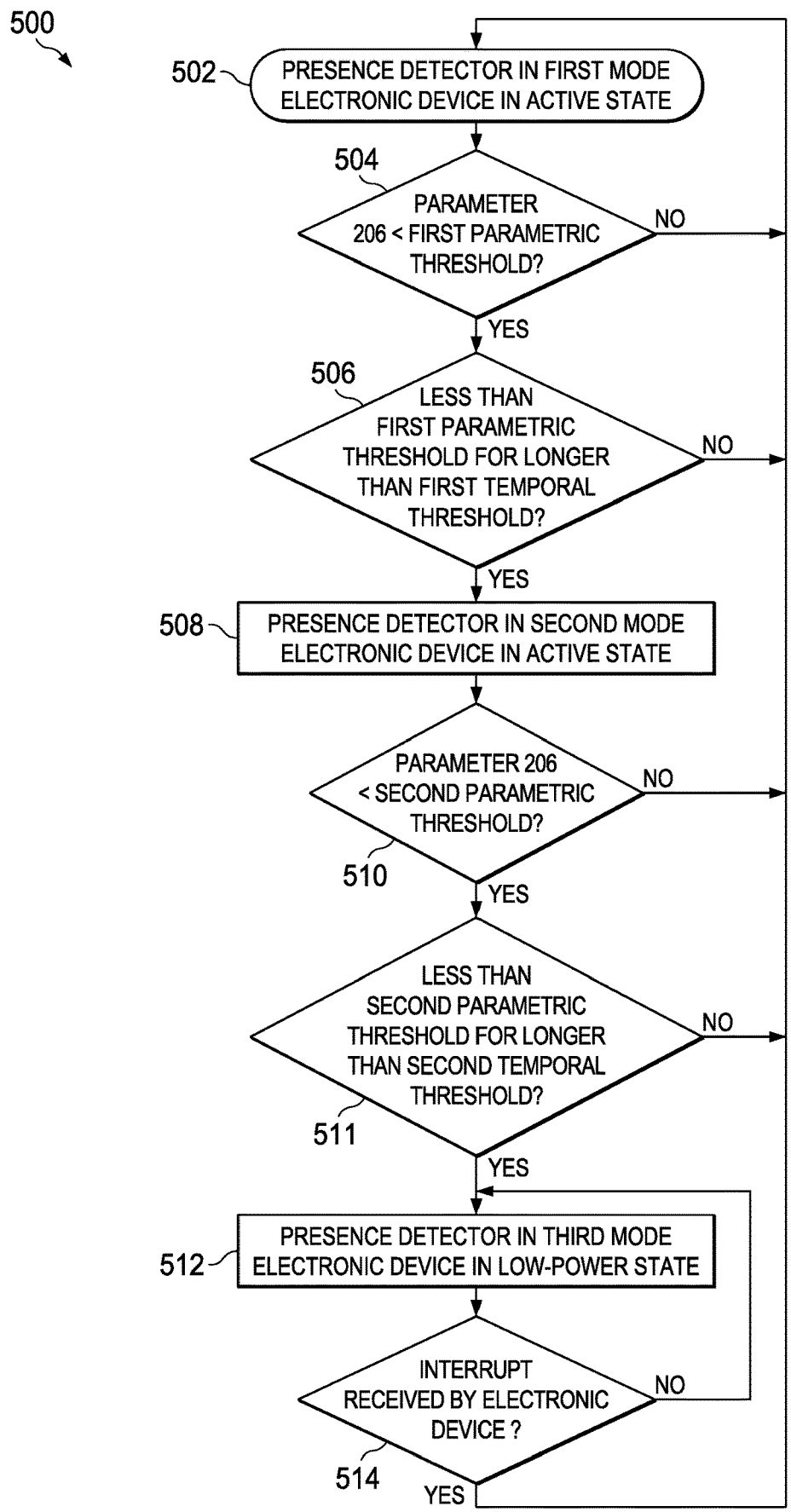
FIG. 5 shows a flow chart illustrating a method of determining macro-variations and micro-variations in a distance between a presence detector and a target, in accordance with an embodiment.

FIG. 5 shows a flow chart illustrating a method 500 of determining macro-variations and micro-variations in the distance D, in accordance with an embodiment. As shown in the flow chart, the method 500 is initiated by placing the presence detector 102 in the first mode and by having the electronic device 104 in the active state (in step 502). For example, the controller 208, using the first control signal 210, may set the first time duration T1 to be in the second time range TR2 (e.g. equal to about 20 ms) and the ranging frequency to be in the first frequency range FR1 (e.g. equal to about 50 Hz). Additionally, in step 502, the controller 208, using the second control signal 212, may cause the electronic device 104 to remain in the active state. In the first mode, the presence detector 102 is configured to perform high speed ranging and gesture detection, as described above in relation to FIG. 4. Such high speed ranging and gesture detection generates parameter 206, which is provided to the controller 208 by the processor 204.

The method 500 includes determining (e.g. by the controller 208) whether the parameter 206 (generated while the presence detector 102 is in the first mode and the electronic device 104 is in the active state) is less than a first parametric threshold (in step 504). As described above, the parameter 206 may be the ratio of the standard deviation σ and the mean distance $D_{mean}$, expressed as a percentage. In such an embodiment, the first parametric threshold may be between about 5 percent and about 20 percent (e.g. about 10 percent). The parameter 206 being greater than the first parametric threshold may be indicative of macro-variations and/or gesture activity in the detection area 110, and thus there may not be a need to cause the electronic device 104 to switch from the active state to the low-power state. In such a scenario, the method 500 proceeds from step 504 back to step 502. On the other hand, the parameter 206 being less than the first parametric threshold may be indicative of a reduced amount of macro-variations and/or gesture activity in the detection area 110. In such a scenario, the method 500 proceeds from step 504 to step 506.

In step 506 of method 500, the controller 208 may determine whether the parameter 206 has been less than the first parametric threshold for an extended period of time. As such, the duration of time during which the parameter 206 has been less than the first parametric threshold is compared against a first temporal threshold. In some embodiments, the first temporal threshold may be between about 3 seconds and about 8 seconds (e.g. about 5 seconds). The parameter 206 being greater than the first parametric threshold for any time during the first temporal threshold may indicate that the reduced amount of macro-variations and/or gesture activity in the detection area 110 has not persisted for an extended period of time. Thus, there may not be a need to cause the electronic device 104 to switch from the active state to the low-power state. In such a scenario, the method 500 proceeds from step 506 back to step 502. On the other hand, the parameter 206 being less than the first parametric threshold for longer than the first temporal threshold (e.g. longer than about 5 seconds) may indicate that the reduced amount of macro-variations and/or gesture activity in the detection area 110 has persisted for an extended period of time. This may indicate the presence of either a dormant animate object 108 or a stationary inanimate object 106 in the detection area 110. As such, there may be a need to determine whether micro-variations in distance are occurring in order to discriminate between a dormant animate object 108 and a stationary inanimate object 106. In such a scenario, the method 500 proceeds from step 506 to step 508.

In step 508 of method 500, the presence detector 102 is placed in the second mode and the electronic device 104 remains in the active state. For example, the controller 208, using the first control signal 210, may set the first time duration T1 to be in the first time range TR1 (e.g. equal to about 1 s) and the ranging frequency to be in the second frequency range FR2 (e.g. equal to about 1 Hz). Additionally, in step 508, the controller 208, using the second control signal 212, may cause the electronic device 104 to remain in the active state. In the second mode, the presence detector 102 is configured to perform high accuracy ranging and micro-variation detection, as described above in relation to FIG. 4. Consequently, the presence detector 102 enters the second mode (e.g. in step 508) when both a parametric threshold and a temporal threshold are met. In essence, high accuracy ranging and micro-variation detection (which consumes more power relative to the first mode and the third mode) is performed when a reduced amount of macro-variations and gesture activity in the detection area 110 has persisted for an extended period of time. This allows for efficient consumption of power by the presence detector. Such high accuracy ranging and micro-variation detection generates parameter 206, which is provided to the controller 208 by the processor 204.

The method 500 includes determining (e.g. by the controller 208) whether the parameter 206 (generated while the presence detector 102 is in the second mode and the electronic device 104 is in the active state) is less than a second parametric threshold (in step 510). The second parametric threshold is less than the first parametric threshold. As described above, the parameter 206 may be the ratio of the standard deviation σ and the mean distance $D_{mean}$) expressed as a percentage. In such an embodiment, the second parametric threshold may be between about 0.1 percent and about 0.5 percent (e.g. about 0.2 percent). The parameter 206 being greater than the second parametric threshold may be indicative of micro-variations of the distance D in the detection area 110, and thus there may not be a need to cause the electronic device 104 to switch from the active state to the low-power state since a dormant animate object 108 may be present in the detection area 110. In such a scenario, the method 500 proceeds from step 510 back to step 502. On the other hand, the parameter 206 being less than the second parametric threshold may be indicative of the absence micro-variations of the distance D in the detection area 110.

However, for a substantially accurate determination that micro-variations of the distance D are absent in the detection area 110, in step 511 of method 500, the controller 208 may determine whether the parameter 206 has been less than the second parametric threshold for an extended period of time. As such, the duration of time during which the parameter 206 has been less than the second parametric threshold is compared against a second temporal threshold. In some embodiments, the second temporal threshold may be greater than the first temporal threshold. As an example, the second temporal threshold may be between about 10 seconds and about 25 seconds (e.g. about 10 seconds or about 20 seconds). The parameter 206 being greater than the second parametric threshold for any time during the second temporal threshold may indicate that the reduced amount of micro-variations and/or gesture activity in the detection area 110 has not persisted for an extended period of time. Thus, there may not be a need to cause the electronic device 104 to switch from the active state to the low-power state. In such a scenario, the method 500 proceeds from step 511 back to step 502. On the other hand, the parameter 206 being less than the second parametric threshold for longer than the second temporal threshold (e.g. longer than about 10 seconds) may indicate that the reduced amount of micro-variations and/or gesture activity in the detection area 110 has persisted for an extended period of time. In such a scenario, it is plausible to infer that no dormant animate object 108 is present in the detection area 110. As such, when the parameter 206 is less than the second parametric threshold for longer than the second temporal threshold, the method 500 proceeds from step 511 to step 512.

In step 512 of method 500, the presence detector 102 is placed in the third mode and the electronic device 104 is placed in the low-power state. For example, the controller 208, using the first control signal 210, may set the first time duration T1 to be in the second time range TR2 (e.g. equal to about 20 ms) and the ranging frequency to be in the second frequency range FR2 (e.g. equal to about 1 Hz). Additionally, in step 512, the controller 208, using the second control signal 212, may cause the electronic device 104 to switch from the active state to the low-power state. In the third mode, the presence detector 102 is configured to perform low-power ranging and macro-variation detection, as described above in relation to FIG. 4. When such a macro-variation in distance D is detected, an interrupt may be generated (e.g. by the controller 208 using the second control signal 212), thereby causing the electronic device 104 to switch from the low-power state to the active state and causing the presence detector 102 to enter the first mode. In this scenario, the method 500 proceeds from step 514 to the step 502. On the other hand, if no interrupt is received by the electronic device 104, this may indicate that no macro-variations of activity occur in the detection area 110, and thus, the presence detector 102 remains in the third mode and the electronic device 104 remains in the low-power state until an interrupt is received. This scenario is depicted in FIG. 5 as the loop between steps 514 and 512.

In summary, the device and method of detecting human presence discussed herein is configured to detect small movements (e.g. micro-variations in distance) that occur within a detection area of a presence detector. Detection of such micro-variations in distance may be sufficient to detect small movements (e.g. human breathing) of a dormant animate object, and thus the device and method of detecting human presence discussed herein may be able to discriminate between a stationary inanimate object and a dormant animate object. In response to a determination that micro-variations in distance are present in the detection area of the presence detector, the presence detector (e.g. a controller included therein) may cause an electronic device to remain in an active state so that the dormant animate object may continue using the electronic device without interruption. On the other hand, in response to a determination that micro-variations in distance are absent in the detection area of the presence detector, the presence detector (e.g. a controller included therein) may cause the electronic device to switch from the active state to a low-power state, thereby conserving power of the electronic device. Furthermore, high accuracy ranging and micro-variation detection may consume a large amount of power, and thus, such ranging and detection is performed when both a parametric threshold and a temporal threshold are met in order to allow for efficient consumption of power by the presence detector.

While the above description has been directed to detecting human presence in front of the presence detector 102 for the purposes of conserving power in the electronic device 104, it is noted that the presence detector 102 and the method of detecting human presence is not limited to such an application. As an example, the presence detector 102 and the method 500 discussed in FIG. 5 may be used to detect and/or monitor the breath of a sleeping baby. In such a scenario, method 500 may be modified such that the electronic device 104 sounds an alarm to alert caregivers when micro-variations and/or gesture activity (e.g. the baby's breathing) in the detection area 110 has persisted for an extended period of time.

Figure 6:
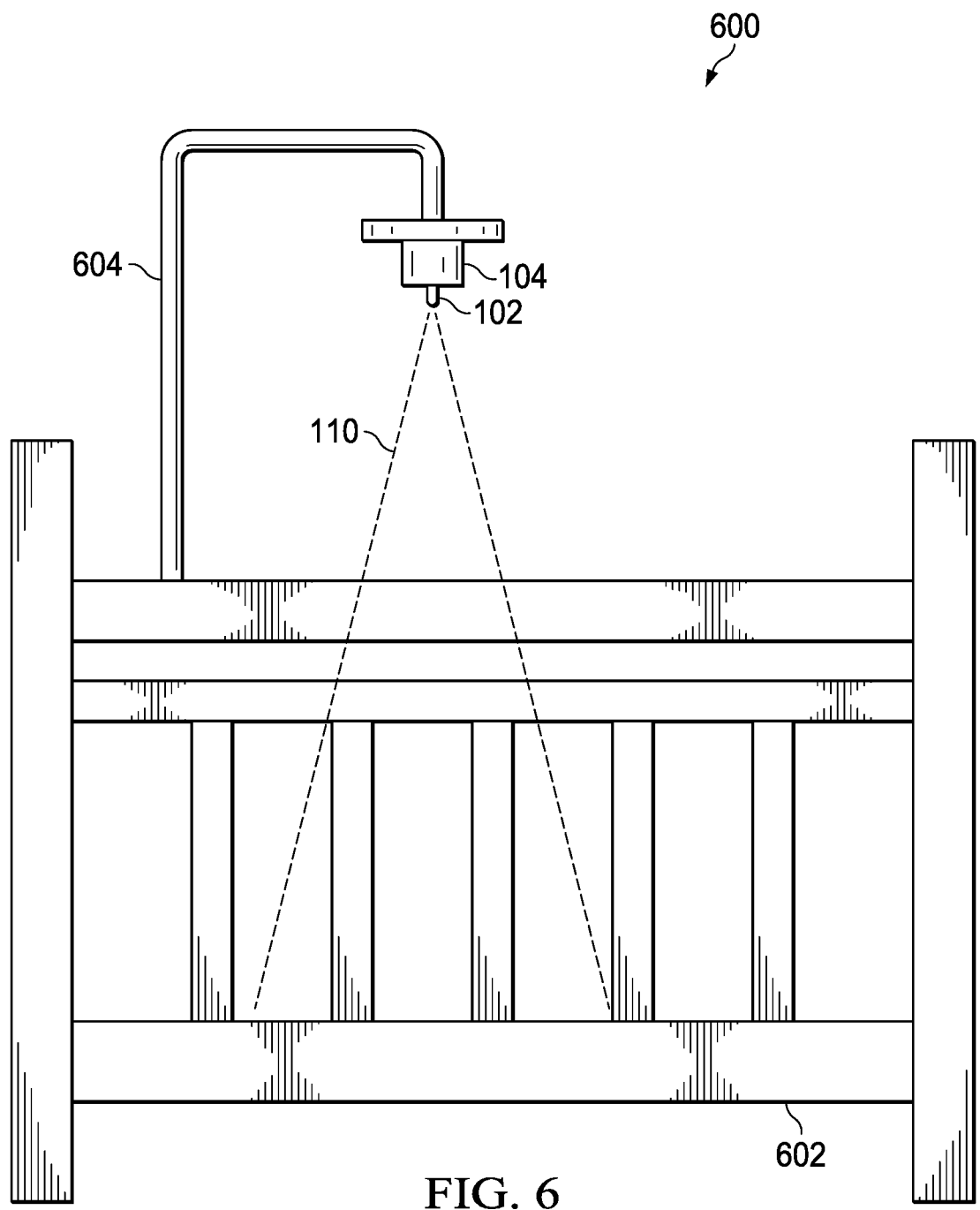
FIG. 6 shows a presence detection system 600, in accordance with another embodiment.

For example, FIG. 6 shows a presence detection system 600, in accordance with another embodiment. As depicted in FIG. 6, presence detector 102 may be communicatively coupled to the electronic device 104 (e.g. a baby-monitor having a camera). In the example shown in FIG. 6, the electronic device 104 is attached or mounted to a crib 602 via a support structure 604. However, in other embodiments, the electronic device 104 may be placed at some distance away from the crib 602 such that at least a portion of the crib 602 is located within the detection area 110 of the presence detector 102.

Macro-variations may be detected in the detection area 110 (e.g. using steps 502, 504, 506 of method 500). Such macro-variations may be caused by the baby's body movements, such as rolling, crawling, shifting body positions, as examples. Furthermore, micro-variations may also be detected in the detection area 110 (e.g. using steps 508, 510, and 511 of method 500). Such micro-variations may be caused by the baby's breathing when the baby is sleeping. The parameter 206 being greater than the second parametric threshold for any time during the second temporal threshold may indicate that the reduced amount of micro-variations and/or gesture activity in the detection area 110 has not persisted for an extended period of time. For example, this may indicated that the baby has fallen asleep and is breathing normally. Thus, there may be a need to cause the electronic device 104 to remain active and not switch to the low-power state so that continued monitoring of the baby may take place. In such a scenario, the method 500 proceeds from step 511 back to step 502. On the other hand, the parameter 206 being less than the second parametric threshold for longer than the second temporal threshold (e.g. longer than about 10 seconds) may indicate that the reduced amount of micro-variations and/or gesture activity in the detection area 110 has persisted for an extended period of time. For example, this may indicate that the baby's breathing has fallen below what is considered as normal depth of breathing. In such a scenario, instead of placing the electronic device 104 in the low-power state (e.g. indicated in FIG. 5 as the transition from step 511 to 512), method 500 may be modified such that the electronic device 104 sounds an alarm to alert caregivers to this anomaly in the baby's breathing. As such, the device and method described above may be used to allow for early intervention in cases where a baby's breathing falls below a predetermined threshold that is indicative of normal infant breathing.

In an embodiment, a device includes an optical source configured to transmit an optical pulse and an optical sensor configured to receive a reflection of the optical pulse. The device further includes a processor configured to determine a parameter based on the reflection, the parameter indicative of a distance between the device and a target; and a controller configured to generate a first control signal based on the parameter, the first control signal being configured to control an operation of the optical source.

In an embodiment, a method includes transmitting, using an optical source, a plurality of optical pulses; receiving, using an optical sensor, a plurality of reflections, each reflection being a reflection of a corresponding optical pulse off a target. The method further includes determining, using a processor, a parameter based on the plurality of reflections, the parameter indicative of a distance between the optical source and the target; and controlling an operation of the optical source based on a comparison of the parameter against a plurality of thresholds.

In an embodiment, a system includes a presence detector and an electronic device coupled to the presence detector. The presence detector may include an optical source configured to transmit an optical pulse, and an optical sensor configured to receive a reflection of the optical pulse. The presence detector may further include a processor configured to determine a parameter based on the reflection, the parameter indicative of a distance between the presence detector and a target; and a controller configured to generate a first control signal based on the parameter, the first control signal being configured to control an operation of the optical source.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A device, comprising:
an optical source configured to transmit an optical pulse in accordance with a timing budget and a ranging period, the timing budget corresponding to a duration in time during which a distance is measured, by the device, from the device to a target, the ranging period corresponding to a period of time between consecutive distance measurements by the device;

an optical sensor configured to receive a reflection of the optical pulse;

a processor configured to determine a parameter corresponding to a quantitative change in the distance between the device and the target, the quantitative change corresponding to distances measured by the device based on the reflection of the optical pulse over consecutive distance measurements by the device; and a controller configured to generate a first control signal based on the parameter, the first control signal being configured to set the timing budget and the ranging period for a subsequent transmission of the optical pulse by the optical source.

2. The device of claim 1, wherein the optical source comprises at least one of a vertical-cavity surface-emitting laser, a quantum well laser, a quantum cascade laser, an interband cascade laser, or a vertical external-cavity surface-emitting laser.

3. The device of claim 1, wherein the optical sensor comprises a sensing array comprising a plurality of optical elements.

4. The device of claim 3, wherein the plurality of optical elements comprises at least one of a photo diode, an avalanche photo diode, or a single-photon avalanche diode.

5. The device of claim 1, wherein the controller is further configured to generate a second control signal based on the parameter, the second control signal being configured to control operation of an electronic device communicatively coupled to the controller.

6. The device of claim 1, wherein the quantitative change corresponds to a macro-variation in a movement of the target, a micro-variation in the movement of the target, a detection of a gesture performed by the target, or a combination thereof.

7. The device of claim 1, wherein the processor is further configured to determine an absence of a micro-variation in a movement of the target based on the quantitative change, and based thereon, generate a second control signal to switch a second device from an active state to a low-power state, the second device communicatively coupled to the device.

8. The device of claim 1, wherein the processor is further configured to determine a micro-variation in a movement of the target based on the quantitative change, and based thereon, generate a second control signal to retain a second device in an active state, the second device communicatively coupled to the device.

9. The device of claim 8, wherein the target is an animate object, the micro-variation in the movement of the animate object corresponding to respiration or variations in posture or position of the animate object.

10. The device of claim 1, wherein determining the parameter based on the reflection of the optical pulse comprises:
determining a time elapsed between transmitting the optical pulse and receiving the reflection of the optical pulse; and
determining the parameter based on the time elapsed.

11. The device of claim 1, wherein in a first mode of the device the processor is configured to determine that the parameter is less than a first parametric threshold, and based thereon, determine a consecutive time duration during which the parameter is less than the first parametric threshold.

12. The device of claim 11, wherein in the first mode of the device is configured for high-speed ranging, the first mode corresponding to a timing budget from about 16 milliseconds (ms) to about 100 ms and a ranging period from about 10 Hertz (Hz) to about 120 Hz.

13. The device of claim 11, wherein in the first mode the processor is further configured to determine that the consecutive time duration during which the parameter is less than the first parametric threshold exceeds a first temporal threshold, and based thereon, switch from the first mode to a second mode of the device.

14. The device of claim 13, wherein in the second mode of the device the processor is configured to determine that the parameter is less than a second parametric threshold, and based thereon, determine a consecutive time during which the parameter is less than the second parametric threshold.

15. The device of claim 14, wherein in the second mode the device is configured for high-accuracy ranging, the second mode corresponding to a timing budget from about 0.5 seconds to about 2 seconds and a ranging period from about 0.5 Hertz (Hz) to about 10 Hz.

16. The device of claim 14, wherein in the second mode the processor is further configured to determine that the consecutive time duration during which the parameter is less than the second parametric threshold exceeds a second temporal threshold, and based thereon:
switch from the second mode to a third mode of the device; and
generate a second control signal to switch a second device from an active state to a low-power state, the second device communicatively coupled to the device.

17. The device of claim 16, wherein the first temporal threshold is from about 3 seconds to about 8 seconds and the second temporal threshold is from about 10 seconds to about 25 seconds.

18. The device of claim 16, wherein in the third mode the device is configured for low-power ranging, the third mode corresponding to a timing budget from about 16 milliseconds (ms) to about 100 ms and a ranging period from about 0.5 Hertz (Hz) to about 10 Hz.

19. The device of claim 16, wherein in the third mode the processor is further configured to determine a macro-variation in a distance from the device to the target, and based thereon, generate a third control signal to switch the second device from the low-power state to the active state.

20. The device of claim 14, wherein in the second mode the processor is further configured to determine that the consecutive time duration during which the parameter is less than the second parametric threshold exceeds a second temporal threshold, and based thereon:
activate a third mode of operation of the device; and
generate an audible alarm by the device to alert inactivity.

21. A system, comprising:
a presence detector, comprising:
an optical source configured to transmit an optical pulse in accordance with a timing budget and a ranging period, the timing budget corresponding to a duration in time during which a distance is measured from a device to a target, the ranging period corresponding to a period of time between consecutive distance measurements by the device;
an optical sensor configured to receive a reflection of the optical pulse;
a processor configured to determine a parameter corresponding to a quantitative change in the distance between the device and the target, the quantitative change corresponding to distances measured by the device based on the reflection of the optical pulse over consecutive distance measurements by the device; and a controller configured to generate a first control signal based on the parameter, the first control signal being configured to set the timing budget and the ranging period for a subsequent transmission of the optical pulse by the optical source; and an electronic device coupled to the presence detector.

22. The system of claim 21, wherein the controller is further configured to generate a second control signal based on the parameter, the second control signal being configured to control an operation of the electronic device.

23. The system of claim 22, wherein the second control signal being configured to cause the electronic device to switch between a low-power state and an active state.

24. The system of claim 22, wherein the optical source is configured to transmit the optical pulse for a first time duration and at a ranging frequency, the ranging frequency being indicative of a second time duration between consecutive transmissions of the optical pulse.

25. The system of claim 24, wherein the first control signal is configured to control the operation of the optical source by varying at least one of the first time duration or the ranging frequency.

26. A device, comprising:
a laser configured to transmit an optical pulse in accordance with a timing budget and a ranging period, the timing budget corresponding to a duration in time during which a distance is measured, by the device, from the device to a target, the ranging period corresponding to a period of time between consecutive distance measurements by the device;

a sensing array configured to receive a reflection of the optical pulse, wherein the sensing array comprises a plurality of optical elements, each optical element of the plurality of optical elements comprising an element selected from a group consisting of a photo diode, an avalanche photo diode, and a single-photon avalanche diode;

a processor configured to determine a parameter corresponding to a quantitative change in the distance between the device and the target, the quantitative change corresponding to distances measured by the device based on the reflection of the optical pulse over consecutive distance measurements by the device; and a controller configured to generate a first control signal and a second control signal based on the parameter, the first control signal being configured to set the timing budget and the ranging period for a subsequent transmission of the optical pulse by the laser, the second control signal being configured to control operation of an electronic device communicatively coupled to the controller.

27. A method, comprising:

transmitting an optical pulse in accordance with a timing budget and a ranging period, the timing budget corresponding to a duration in time during which a distance is measured from a device to a target, the ranging period corresponding to a period of time between consecutive distance measurements;

receiving a reflection of the optical pulse;

determining a parameter corresponding to a quantitative change in the distance between the device and the target, the quantitative change corresponding to distances measured by the device based on the reflection of the optical pulse over consecutive distance measurements by the device; and generating a first control signal based on the parameter, the first control signal used to set the timing budget and the ranging period for a subsequent transmission of an optical pulse.

* * * * *